(12) United States Patent
Zesch et al.

(10) Patent No.: US 12,298,592 B2
(45) Date of Patent: May 13, 2025

(54) TILTABLE MIRROR DEVICE

(71) Applicant: Optotune AG, Dietikon (CH)

(72) Inventors: Wolfgang Zesch, Dietikon (CH);
Manuel Aschwanden, Dietikon (CH);
Alan Cortizo, Dietikon (CH); Xavier Palou Garcia, Dietikon (CH); Michael Zihlmann, Dietikon (CH); Felix Arnold, Dietikon (CH)

(73) Assignee: Optotune Switzerland AG, Dietikon (CH)

( * ) Notice: Subject to any disclaimer, the term of this patent is extended or adjusted under 35 U.S.C. 154(b) by 490 days.

(21) Appl. No.: 17/722,355

(22) Filed: Apr. 17, 2022

(65) Prior Publication Data

US 2022/0334349 A1    Oct. 20, 2022

(51) Int. Cl.
| G02B 26/08 | (2006.01) |
| G02B 5/08 | (2006.01) |
| G02B 7/182 | (2021.01) |
| G02B 7/198 | (2021.01) |

(52) U.S. Cl.
CPC ......... *G02B 7/1821* (2013.01); *G02B 5/0808* (2013.01); *G02B 7/198* (2013.01); *G02B 26/0816* (2013.01)

(58) Field of Classification Search
CPC .... G02B 7/1821; G02B 5/0808; G02B 7/198; G02B 26/0816; G02B 26/085; G02B 26/105
See application file for complete search history.

(56) References Cited

U.S. PATENT DOCUMENTS

| 6,249,367 B1 * | 6/2001 | Hirose | ............... G02B 26/0808 |
| | | | 359/872 |
| 2002/0018183 A1 | 2/2002 | Ito | |
| 2002/0181839 A1 | 12/2002 | Brown | |
| 2010/0165433 A1 | 7/2010 | Shigematsu | |
| 2018/0267294 A1 | 9/2018 | Aschwanden | |

* cited by examiner

Primary Examiner — Euncha P Cherry
(74) Attorney, Agent, or Firm — JMB Davis Ben-David

(57) ABSTRACT

The invention relates to a tiltable mirror device (1) comprising the components:
a tiltable portion (2) comprising a substrate (2.1) having a reflective layer (2.2) for reflecting electromagnetic waves,
a fixed portion (3) relative to which the tiltable portion (2) is movable,
a bearing assembly (4) mechanically connecting the fixed portion (3) and the tiltable portion (2), wherein the bearing assembly (4) is arranged to render the tiltable portion (2) tiltable around at least one axis of rotation (100) with respect to the fixed portion (3),
an actuator assembly, wherein the actuator assembly comprises two components, namely a coil portion (6) comprising one or more coils (6.1, 6.2) each comprising an electric conductor (6.3), and a magnetic assembly (5), wherein one component of the actuator assembly is comprised by the tiltable portion (2), and wherein the other component of the actuator assembly is comprised by the fixed portion (3), wherein the components of the actuator assembly are arranged to move the tiltable portion (2) with respect to the fixed portion (3) by means of a Lorentz force,
wherein
the actuator assembly is arranged, particularly completely arranged in an actuation space (300) extending away from the reflective layer (2.2) on a single side of the reflective layer (2.2).

13 Claims, 6 Drawing Sheets

TILTABLE MIRROR DEVICE

CROSS-REFERENCE TO RELATED APPLICATIONS

Benefit is claimed to German Patent Application No. 10 2021 109 654.5 filed on Apr. 16, 2021, the contents of which are incorporated by reference herein in their entirety.

FIELD

The invention relates to a tiltable mirror device.

BACKGROUND

Tiltable mirror devices are known in the art. For example, so-called galvo-scanners are based on the principle of generating a Lorentz force in an actuation assembly comprising a magnetic assembly and a coil portion, such that a rotational motion of a substrate comprising a deflection mirror of a tiltable portion around an axis of rotation is achieved. However, in the art, the actuation assembly is usually arranged laterally shifted along the axis of rotation with respect to the substrate, such that large tilt angles or even a full rotation of the substrate may be achieved and also that the space comprising the actuation assembly may not be limited by the tiltable portion.

SUMMARY

In some applications however, there is a need for particularly compact, energy-conserving devices, as geometric restraints apply. Also, in some application there may be no need for particularly large tilt angles, but a small tilt angle range may just be sufficient.

An object of the present invention is to provide a compact and robust device with a tiltable mirror.

The object is achieved by the device having the features of claim 1.

Advantageous embodiments are described in the dependent claims.

According to claim 1, a tiltable mirror device particularly for optical scanning and optical beam positioning applications comprises at least the components:
  A tiltable portion comprising a substrate having a reflective layer for reflecting electromagnetic waves,
  A fixed portion relative to which the tiltable portion is movable,
  A bearing assembly mechanically connecting the fixed portion and the tiltable portion, wherein the bearing assembly is arranged to rotationally mount the tiltable portion around at least one axis of rotation with respect to the fixed portion,
  An actuator assembly, wherein the actuator assembly comprises two components, namely a coil portion comprising one or more coils each comprising an electric conductor, and a magnetic assembly, wherein one component of the two components of the actuator assembly is comprised by the tiltable portion, and wherein the other component of the two components of the actuator assembly is comprised by the fixed portion, wherein the components of the actuator assembly are arranged to move the tiltable portion with respect to the fixed portion by means of a Lorentz force.

The invention is characterized in that the actuator assembly is arranged, particularly completely arranged in an actuation space extending away, particularly with respect to a surface normal vector, from the reflective layer on a single side of the reflective layer.

The device comprises at least two portions that a movable relatively to each other. One of these portions is referred to as the tiltable portion, wherein the other portion is referred to as the fixed portion in the context of the current specification. The fixed portion may be comprised in an optical device or a housing, to which the tiltable portion is tiltable arranged.

Therefore, all components arranged on the tiltable portion are movable with respect to the fixed portion, while components arranged on the fixed portion remain fixed, during motion of the tiltable portion.

The substrate may be formed from a solid compound, such as a polymer. The substrate particularly serves as a carrier for a reflective portion that forms the reflective layer. The reflective layer may be a planar and flat reflective layer. Alternatively, the reflective layer may have a curved surface, such as a concave or a convex surface.

The reflective layer may comprise a metal layer, such as a silver, a gold and/or an aluminum layer. Alternatively, the reflective layer may comprise a dielectric coating.

The reflective layer may be connected to or integrally formed with the substrate. Thus, the substrate may consist of a reflective compound, wherein the reflective layer may be formed as a surface of the substrate. In other words, the substrate and the reflective layer may be built monolithically. The reflective layer and the substrate may form a mirror element of the device. In addition, the mirror element may be comprised in a mirror portion that for example comprises a receptacle for the mirror element.

The reflective layer has a reflective surface that faces toward a first side. Light or more generally electromagnetic waves impinging on said first side will be reflected by the reflected layer. Opposite the first side of the reflective layer a second side of the reflective layer is defined.

By tilting the tiltable portion the substrate's orientation is changed, which allows controlling a direction of reflection of electromagnetic waves by the reflective layer.

The bearing assembly defines the at least one axis of rotation around which the tiltable portion may rotate. The axis of rotation can be an imaginary axis, i.e. the axis of rotation is a purely geometrical axis, or the axis of rotation may be a physical axis comprising physical elements that constitute said axis.

The term "imaginary" particularly refers to a non-physical member or entity.

The reflective layer may comprise an optical axis. With respect to the axis of rotation the optical axis extends orthogonally away from the axis of rotation toward (or away from) the first side of the reflective layer.

Particularly, at least at the axis of rotation the optical axis coincides with a z-axis of a Cartesian coordinate system attached to the tiltable portion, wherein the coordinate system extends along the substrate with its x- and y-axis, wherein particularly the axis of rotation corresponds to the y-axis. Relative to the fixed portion, this Cartesian coordinate system of the tiltable portion tilts with the tiltable portion.

In addition, a Cartesian coordinate system may be associated to the fixed portion. Upon tilting of the tiltable portion the coordinate system of the fixed portion remains unaltered in its orientation. Particularly in an equilibrium state of the mirror device, the z-axes of the Cartesian coordinate system of the tiltable portion and the fixed portion align. This situation may be used to define a tilt angle of 0° of the reflective layer. In this situation the z-axis of Cartesian coordinate system of the fixed portion aligns with the optical axis.

The x and y-axis of the coordinate system associated to the fixed portion extend correspondingly along the x- and y-axis of the coordinate system of the tiltable portion, when the tiltable portion is in equilibrium state or assumes a tilt angle of 0°.

Thus, the y-axis of the fixed coordinate system particularly extends along the axis of rotation.

Alternatively, or additionally, a cylindrical coordinate system may be established with respect to the axis of rotation, wherein the axis of rotation is the cylinder axis, wherein a radial direction is defined by the directions perpendicular to the axis of rotation, and the angular coordinate is provided with respect to a direction that is fixed and defined by the fixed portion. The cylindrical coordinate system is particularly not moving with the tiltable portion, but may be used to describe tilt angles of the tiltable portion relative to the fixed portion.

According to another embodiment of the invention, the substrate and/or reflective layer extends symmetrically around the axis of rotation, particularly with respect to the x- and y-axis of the Cartesian coordinate system attached to the substrate and thus the tiltable portion. This embodiment allows for a center of mass of the substrate to be on or in close vicinity of the optical axis.

The coil portion of the actuator assembly is a portion of the device that comprises the one or more coils. Each coil in turn comprises an electric conductor, for example in form of a conductive wire. In case the device comprises more than one coil, the coils may be stacked on each other and/or be arranged laterally shifted with respect to their winding axes.

Each coil comprises at least one coil winding formed by the electric conductor, wherein the coil winding circumferentially surrounds the winding axis of the coil.

The winding axis is also referred to as the coil axis in the current specification. The coil windings are arranged along an imaginary surface that may be curved and that intersects essentially perpendicularly with the winding axis of the coil.

The winding axis particularly refers to an axis of symmetry of the coil around which the conductor windings of the coil are circumferentially arranged.

It is clear to the person skilled in the art that in order to induce a Lorentz force in the one or more coils that lead to a movement of the tiltable portion the magnetic assembly has to be exhibit a magnetic field that is suitable to evoke a net Lorentz force for moving the tiltable portion, when an electric current is provided to the one or more coils.

The magnetic assembly may comprise at least one permanent magnet and/or a magnetizable compound that is configured to at least temporarily provide a magnetic field.

The actuator assembly therefore may be considered as a magnetic actuator assembly, particularly as a galvanometric actuator assembly.

According to the invention, the actuator assembly is arranged, particularly completely arranged, in the actuation space.

Particularly, in an equilibrium state of the device, when the tilt angle of the reflective layer is 0°, the actuator assembly is completely located in a half-space the extends away from the second side of the reflective layer. A tilt angle of 0° particularly corresponds to the situation when the optical axis and the z-axis of the coordinate system of the tiltable portion coincides with the z-axis of the fixed portion coordinate system.

Alternatively, or additionally, the actuation space extends on an opposite side or imaginary plane, on which electromagnetic waves impinge on the reflective layer, particularly on which the electromagnetic waves impinge on the surface facing toward the first side of the reflective layer.

In contrast to device known in the art, the actuator assembly according to the invention is particularly not arranged laterally shifted with respect to the reflective layer and/or does not completely surround the axis of rotation, but is essentially arranged behind the reflective layer. This allows for a more compact design of the mirror tilting device according to the invention.

According to another embodiment of the invention, an imaginary main extension plane extends along the substrate at least in a vicinity of the axis of rotation, wherein the main extension plane extends along an x-axis and a y-axis of the Cartesian coordinate system associated or attached to the tiltable portion, wherein the y-axis corresponds to the axis of rotation, and wherein the main extension plane tilts together with the substrate, wherein a z-axis of the Cartesian coordinate system associated to the tiltable portion extends perpendicular to the x and y axis along a radial direction with respect to the axis of rotation, particularly wherein a middle plane of the tiltable portion extends along the z-axis and comprises the axis of rotation.

Particularly, in case the reflective layer is a planar layer, the main extension plane extends along the reflective layer. In this case the optical axis intersects orthogonally with said main extension plane, and is parallel or corresponds to the z-axis which then forms the tiltable coordinate system.

According to another embodiment of the invention, a center of mass of the tiltable portion is comprised in a close vicinity or in the axis of rotation, particularly wherein the center of mass is comprised in a region extending not more than 1 mm, more particularly not more than 0.5 mm away from the axis of rotation.

This embodiment allows for a more stable and robust actuation of the device. Particularly, this embodiment is more robust against mechanical shocks during actuation.

According to another embodiment of the invention, the bearing assembly comprises an elastic structure and a support. The support is configured to limit a translational motion of the tiltable portion and to allow a rotational motion of the tiltable portion. In particular, the support provides a mechanical stop in at least one direction. The support may comprise a needle bearing or a knife bearing.

Particularly, in an embodiment, the elastic structure is configured to reduce a play of the tiltable portion with respect to the fixed portion, in directions in which the relative movement of the tiltable portion and the movable portion is not limited by the support. Furthermore, according to an embodiment, the elastic structure is configured to provide stiffness for a rotational motion direction of the tiltable portion.

According to another embodiment of the present invention, the elastic structure comprises a plurality of spring members, each spring member connecting the tiltable portion, particularly the receptacle or the substrate to the fixed portion.

According to an embodiment, the respective spring member is a flat plate member. particularly cut from a sheet of a suitable material, particularly a metal.

Furthermore, according to a preferred embodiment, the respective spring member comprises a meandering shape.

According to a further preferred embodiment, the spring members extend along a common extension plane, wherein particularly in plane motions of the tiltable portion along said common extension plane are prevented by the spring structure/spring members due to in-plane-stiffness being particularly at least ten times larger than a stiffness of the elastic structure in a torsion mode.

Particularly, this common extension plane extends parallel to a plane comprising the x- and the y-axis of the coordinate system associated to the fixed portion or the tiltable portion.

According to yet another embodiment, the spring members are integrally connected to one another and particularly form a single plate member. Preferably, the spring members/said plate member are/is cut (e.g. laser cut or stamped) form a single sheet.

According to a further embodiment of the present invention, the bearing assembly comprises magnets arranged on configured to pre-load the elastic structure. These magnets may be the same or different magnets as the ones comprised in the magnetic assembly.

According to a further embodiment, the tiltable portion, particularly the receptacle or the substrate comprises a first portion, wherein the tiltable portion is supported by the support on the fixed portion via the first portion. The tiltable portion, particularly the receptacle or the substrate may comprise a second portion, wherein the tiltable portion, particularly the receptacle or the substrate is supported by the support on the fixed portion by the second portion. The first and the second portion protruding from opposite sides of the tiltable portion, particularly the receptacle or the substrate and the first and the second portion are particularly aligned with one another and with the axis of rotation. Particularly, each of the two portions can be formed as an elongated beam along the axis of rotation.

According to a preferred embodiment, the spring structure comprises two spring members arranged on either side of the first portion of the tiltable portion and two spring members arranged on either side of the second portion of the tiltable portion.

According to a further embodiment, the first portion is supported on the fixed portion via a first part of the support. Furthermore, the second portion can be supported on the fixed portion via a separate second part of the support.

Preferably, the respective part (i.e. the first part and the second part) of the support can each be one of:
a sphere;
a hemisphere;
a structure comprising an edge facing the respective portion, the respective portion being supported on said edge;
a bearing comprising a pin arranged in one of: a hole, a groove, particularly the pin is oriented along the axis of rotation;
a bearing comprising a pin being arranged in a bearing sleeve, particularly wherein the bearing sleeve limits a translational motion of the tiltable portion;
a ball bearing, particularly wherein the ball bearing limits said translation of the tiltable portion;
a slide bearing, particularly a dry slide bearing or a lubricated slide bearing;
an elastic body, particularly formed out of an elastomer;
a spring, particularly a coil spring or a leaf spring;
a contact-free magnetic bearing, particularly wherein the two magnets repel one another.

Further, in an embodiment, the respective bearing is pre-loaded, particularly by one of: gravity, the elastic structure (particularly by said spring members), pre-loading springs, by means of magnetic forces provided by magnets.

According to yet another embodiment, the support is formed by the elastic structure. For example, the elastic structure comprises at least one leaf spring, wherein the main extension direction of the leaf spring extends along the z-axis of the coordinate system associated to the tiltable portion. In particular, the elastic structure comprises multiple leaf springs, wherein at least one of the multiple leaf springs provides a support along the z-axis of the coordinate system associated to the tiltable portion.

According to a further embodiment of the device according to the present invention, the tiltable portion is supported on the fixed portion via a damper, particularly comprising no or low static stiffness. In particular, the stiffness is selected depending on the inertia of the first carrier such that the pivotable movement has a maximum resonance frequency of 30 HZ.

According to one embodiment, the elastic structure comprises two first elastic legs, wherein each elastic leg particularly forms a leaf spring. The first legs diverge so that the first legs form an angle, particularly an acute angle.

Preferably, the elastic structure comprises two second elastic legs (e.g. each forming a leaf spring) connected to the second connecting portion, wherein the second legs protrude from the second connecting portion and diverge so that the second legs form an angle, particularly an acute angle, too.

Particularly, each of the four legs comprises an end section forming a fastening region, the respective leg being connected to the second carrier (or a mount) via its fastening region.

Particularly, the first connecting portion and the first elastic legs connected thereto form a first arch-shape member. Likewise, particularly, the second connecting portion and the second elastic legs connected thereto form a second arch-shape member. The arch-shaped members allow pivoting of the first carrier about the first axis being defined by the arch-shaped members by allowing bending of the connecting portions and legs connected thereto.

According to another embodiment of the invention, the bearing assembly comprises a first and a second bearing arranged on opposite sides of the tiltable portion at the axis of rotation. In particular, the first and the second bearing are needle bearings.

The first and a second bearing elements may be formed as force transmitting elements that allow the tiltable portion to tilt around the axis of rotation, particularly wherein each force transmitting element is arranged to transmit a force from the fixed portion to the tiltable portion.

According to another embodiment of the invention, the tiltable portion may adopt only tilt angles in a range of −30° to 30°, particularly in the range of −15° to 15°, more particularly in a range of −10 to 10°. In particular, the range of possible tilt angles may be limited by means of a hard stop. The hard stop may comprise a spring or an elastic element, which may comprise PDMS.

According to another embodiment of the invention, the device comprises a sensor arranged in the actuation space, wherein the sensor is configured to determine an angular position of the substrate around the axis of rotation with respect to the fixed portion.

The sensor might be an optical sensor, a hall sensor, or a capacitive sensor.

The sensor is arranged to determine a position of the tiltable portion relative to the fixed portion, particularly in form of an angular position of the substrate.

According to another embodiment of the invention, the device comprises a liquid ferrofluidic compound arranged between the coil portion and the magnetic assembly, particularly wherein said ferrofluidic compound is arranged in the gap between the coil portion and the magnetic assembly.

The ferrofluidic liquid particularly serves for cooling as it transports heat from the coil portion away, but may also increase the field strength at the gaps between the coil portion and the first and second portion of the fixed portion.

Further, the ferrofluidic liquid, due to its specific properties may contain itself in the gaps and does not seep out of the device. Additionally, the ferrofluidic liquid may have a damping effect on the device, such that an increased robustness is achieved.

According to another embodiment of the invention, the tiltable portion comprises a receptacle for the substrate, wherein the receptacle is directly connected to the bearing assembly, particularly wherein the receptacle comprises a heat insulating compound, particularly wherein the receptacle connects the component of the actuator assembly arranged on the tiltable portion with the substrate, such that the substrate is thermally insulated from said component, particularly wherein said compound is PEEK.

This embodiment allows for a modular assembly of the device and particularly exchanging the substrate of the device for different applications. Moreover, in case the receptacle comprises a heat insulating compound and improved operation of the device is achieved, as the heat generated upon actuation of the device may not be transported to the substrate which in turn protects the reflective layer of the substrate from unwanted thermal distortions.

The term heat insulating compound particularly refers to a compound that comprises a heat conductivity smaller than 50 W/m/K, more particularly smaller than 10 W/m/K, even more particularly smaller than 1 W/m/K.

According to another embodiment of the invention, the actuation space is limited along the axis of rotation by the first and the second bearing or wherein the actuation space is limited along the axis of rotation by an extension of the substrate or the receptacle along the y-axis of the main extension plane, particularly such that the actuator assembly is not extending beyond the bearing, the substrate or the receptacle. In particular, the actuation space does not protrude beyond the receptacle or the substrate as seen in a top view, wherein the top view is directed along the z-axis.

In particular, the bearing assembly is completely arranged within the actuation space. Preferably the bearing assembly does not protrude beyond the substrate as seen in a top view along the z-axis.

This embodiment allows for a particularly compact design, as essentially the whole actuator assembly is arranged "behind" the substrate, e.g. not visible from the first side of the substrate and therefore does not require additional lateral space beyond the substrate's lateral extension. Preferably, the actuator assembly does not protrude beyond the reflective surface in directions along the main extension plane.

According to another embodiment of the invention, the coil portion is comprised by the tiltable portion and the magnetic assembly is comprised by the fixed portion.

This embodiment advantageously allows for a comparably light-weight tiltable portion, as the coil portion is typically lighter than the magnetic assembly, which allows for more energy efficient actuation of the tiltable portion and therefore causes a lower heat generation. Additionally, the weight of the magnetic assembly does not have any impact on the moving mass of the tiltable portion. Thus, the integration of the magnetic assembly in the fixed portion allows for particularly heavy magnets having a particularly strong magnetic field.

According to another embodiment of the invention, the coil portion extends away from the reflective layer into the actuation space and wherein the coil portion extends at least partially along an imaginary curved surface, particularly a cylindrical surface, centered around the at least one axis of rotation, wherein the conductor of the one or more coils extends circumferentially around a winding axis of the coil, the winding axis extending perpendicular with respect to the axis of rotation, wherein the conductor of each coil extends along said imaginary curved surface.

Particularly, in case the curved surface is identical to a cylinder surface, the cylinder axis corresponds to the axis of rotation.

However, it is noted that the term cylinder and related terms particularly also includes geometric shapes having a non-circular, particularly elliptical or oval base area or a base area the is piecewise circular only.

According to this embodiment the coil portion is particularly formed as a hollow half-cylinder or a fraction of a hollow half-cylinder, i.e. covering an angular surface of less than 180°.

Particularly, the coil portion is formed as a curved band, particularly a half-cylindrical band, extending at least partially along an imaginary cylindrical surface centered around the axis of rotation, wherein the curved band extends away from the reflective layer and particularly away from the main extension plane of the substrate into the actuation space, wherein the one or more coils each comprise a coil axis pointing radially toward the axis of rotation, particularly wherein the coil axis of at least one coil intersects orthogonally with the main extension plane, particularly wherein a circumference of each of the one or more coils is at least 5 to 10 times larger than a coil height along the coil axis, particularly wherein the one or more coils are flat coils curved along the curved band.

In particular, the coil portion is arranged radially further away from the axis of rotation than the magnetic assembly. The coil portion extends away from the reflective layer into the actuation space at least partially along an imaginary curved surface, particularly a cylindrical surface, centered around the axis of rotation. The coil comprises two straight section extending along the cylindrical surface and two curved section extending along the cylindrical surface The coil portion being formed along the curved surface allows for the tilting of the tiltable portion around the axis of rotation, while at the same time allowing for a compact magnetic assembly formed along the curved surface of the coil portion. This in turn allows for the actuator assembly to be arranged in a half space, namely the actuation space.

Moreover, the coil portion may be directly attached to a back side, i.e. the second side of the substrate or the mirror portion.

The at least one coil comprised in the coil portion may be arranged with its winding axis essentially on the z-axis of the coordinate system of the tiltable portion.

The one or more coils may have a larger circumference than height, wherein the height of each coil is measured along its coil axis and the circumference is measured along a plane perpendicular to the coil axis. This allows for arranging the one or more coils with their coil axes pointing radially toward the axis of rotation, while maintaining a particularly partially hollow-cylindrical curved shape of the coil portion.

The coil portion may comprise one or more recesses or holes, particularly wherein each recess or hole is arranged around a coil axis of the one or more coils in the coil portion.

Said recess may be used for establishing a support structure for portion that are arranged on the fixed portion and that are closer to the axis of rotation than the coil portion.

According to another embodiment of the invention, the magnetic assembly comprises a first portion that is arranged radially further away from the axis of rotation than the coil portion, wherein the first portion comprises a first section that is arranged in a first angular space section with respect to the axis of rotation, wherein the first section has a first actuation face facing toward the coil portion particularly extending along or tangentially to the imaginary surface forming a first gap section between the coil portion and the first section, and wherein the first portion further comprises a second section that is arranged in a second angular space section with respect to the axis of rotation, wherein the second section has a second actuation face facing toward the coil portion particularly extending along or tangentially to the imaginary surface forming a second gap section between the coil portion and the second actuation face, wherein a magnetic field generated by the magnetic assembly extends from the first section via the first actuation face over the first gap section toward the coil portion and from the coil portion over the second gap portion via the second actuation face into the second section of the magnetic assembly, such that a magnetic field extends through the one or more coils in a fashion that allows for generating an Lorentz-force for moving the coil portion, when an electric current is provided to the one or more coils.

This embodiment teaches a specific arrangement and layout of the magnetic assembly in order to induce a Lorentz-force in the one or more coils in the coil portion such as to move the tiltable portion around the axis of rotation.

Particularly, the gap sections may evoke an airflow which cools the coil portion by moving the coil portion relative to the fixed portion.

The first portion of the magnetic assembly is arranged further away from the axis of rotation than the coil portion and thus may be designed with respect to its magnetic power according to the necessary specifications of the device. Particularly, this design allows for almost unlimited size of the magnetic portion, as compared to designs, where the magnetic portion is arranged movable on the tiltable or rotatable portion of similar mirror devices.

Particularly, the first and the second angular space sections are arranged with respect to the axis of rotation in such a way that a plane extending through the axis of rotation and along a 0° tilt angle direction (which points essentially along the z-axis of the fixed portion coordinate system) separates the actuation space into the first angular space section extending and the second angular space section. Particularly, the first angular space section extends in the space defined by positive tilt angles and the second angular space section extends in the space defined by negative tilt angles.

Simply spoken, the first section of the first portion may be located left (or right) of the rotation axis and further way from the axis of rotation than the coil axis, when viewed along the axis of rotation and the second section of the first portion may be located right (or left) of the rotation axis and further way from the axis of rotation than the coil axis, when viewed along the axis of rotation. These space sections in which the first and the second section of the first portion are located are referred to as angular space sections.

Particularly, the first actuation face and/or the second actuation face extend parallel to a surface of the coil portion such that the first and the second gap section have a constant width and size along the actuation faces of the magnetic assembly.

Due to this gap the coil portion may move relative to the magnetic assembly.

According to another embodiment of the invention, opposite of the first and/or the second actuation face a conductor of the one or more coils is located such that a Lorentz force may be generated, when an electric current is supplied to the one or more coils of the coil portion.

According to another embodiment of the invention, the first section of the magnetic assembly comprises a first permanent magnet, particularly a first bar magnet generating a magnetic field along a first direction particularly along the z-axis of the coordinate system of the fixed portion, and/or wherein the second section of the magnetic assembly comprises a second permanent magnet particularly a second bar magnet generating a magnetic field along a second direction that points essentially in the opposite direction than the first direction.

This embodiment allows for a cost-efficient manufacturing of the magnetic assembly.

According to another embodiment of the invention, the magnetic assembly comprises a second portion of the magnetic assembly that is arranged radially closer to the axis of rotation than the coil portion, wherein the second portion has a second portion face extending along or tangentially to the coil portion forming a gap between the coil portion and the second portion face, particularly wherein the magnetic field of the magnetic assembly extends inside said second portion from the first angular space section toward the second angular space section, particularly wherein the second portion comprises a compound with a magnetic permeability greater than one, particularly wherein the second portion comprises a ferromagnetic compound.

This embodiment allows for an improved magnetic flux of the magnetic field with respect to the coil portion and the first magnetic portion. Particularly, the second portion forms a magnetic flux return structure.

The second portion face may be essentially formed along the curved surface of the coil portion such that the gap exhibits a constant width and size. In particular, the width of the gap is at least 20% and at most 70% of a radius of the magnetic assembly, wherein the radius of the magnetic assembly is measured from the axis of rotation to the curved surface.

According to another embodiment of the invention, the second portion face faces the first and the second actuation faces, wherein particularly the second portion face is arranged parallel to the first and the second actuation face.

According to another embodiment of the invention, the second portion face has a corresponding shape to the first and the second actuation faces.

According to another embodiment of the invention, the magnetic assembly comprises a base portion connecting the first and the second section of the first portion, particularly wherein the base portion comprises a compound with a magnetic permeability of greater than one, particularly wherein the base portion comprises a ferromagnetic compound.

The base portion allows for guiding and concentrating the magnetic flux form the first to the second portion in the base portion.

According to another embodiment of the invention, the second portion is connected to the first portion by means of a support structure of the fixed portion that extends particularly orthogonally through a free center portion of the coil portion, particularly wherein the free center portion comprises the winding axis of the one or more coils, wherein the support structure extends between the first and the second section, particularly wherein the support structure comprises a compound with a heat conductivity greater than 40 W/m/K, particularly greater than 100 W/m/K, particularly wherein the support structure comprises a paramagnetic and/or a ferromagnetic compound, more particularly wherein the compound comprises aluminum.

The support structure particularly allows for a thermal heat sink that transports heat away from the substrate toward the fixed portion, and thus serves as a cooling element.

According to another embodiment of the invention, the magnetic assembly comprises cooling channels configured to flow a coolant, particularly a liquid coolant, through the magnetic assembly such that heat generated for example due to actuation of the actuator assembly at the coil portion may be transported away from the substrate by the coolant, particularly wherein the cooling channels are liquid-tight.

In the following an alternative general embodiment is disclosed, wherein the coil portion is nonetheless arranged on the tiltable portion, while the magnetic flux is oriented generally along the axis of rotation.

According to another embodiment of the invention, the coil portion is formed as a disc-shaped portion extending into the actuation space and that is oriented orthogonally to the axis of rotation, wherein the conductor of the one more coils extends circumferentially around a winding axis of the coil, the winding axis extending parallel to the axis of rotation, particularly wherein the conductor of each coil extends in the coil portion, particularly wherein a circumference of each of the one or more coils is at least 10 times larger than a coil height along the winding axis, particularly wherein the one or more coils are a flat coil.

The disc-shaped coil portion essentially extends along a plane perpendicular to the axis of rotation. The coil portion particularly does not comprise a circular circumference.

Particularly the one or more coils comprise an inner section and an outer section. In the inner section the conductor extends along a first circular orbit section and in the outer section the conductor extends along a second circular orbit section, wherein the first and the second circular orbit section have different radii of curvature. The inner section is closer to the axis of rotation than the outer section.

Further, the one or more coils may comprise radial sections extending between the inner and the outer section. The radial sections extend essentially perpendicular with respect to the axis of rotation.

According to another embodiment of the invention, the magnetic assembly comprises a first portion that is arranged on a first side along the axis of rotation of the coil portion, wherein the first portion comprises a first section that is arranged in a first angular space section with respect to the axis of rotation, wherein the first section has a first actuation face facing toward the coil portion particularly extending along the first side of the coil portion forming a first gap section between the coil portion and first section, and wherein the first portion further comprises a second section that is arranged in a first angular space section with respect to the axis of rotation, wherein the second section has a second actuation face facing toward the coil portion forming a second gap section between the coil portion and the second actuation face, wherein a magnetic field generated by the magnetic assembly extends from the first section from the first actuation face via the first gap section toward the coil portion and from the coil portion via the second gap portion to the second actuation face into the second section of the magnetic assembly, such that a magnetic field extends through the one or more coils in a fashion that allows for generating an Lorentz-force for moving the coil portion, when an electric current is provided to the one or more coils.

Definitions provided for the term angular space section have been provided in previous embodiments and may apply as well for the alternative embodiments.

According to another embodiment of the invention, the magnetic assembly comprises a second portion arranged on a second opposite side of the coil portion, wherein the second portion comprises a first section that is arranged in the first angular space section with respect to the axis of rotation, wherein the first section has a first actuation face facing toward the coil portion, particularly extending along the second side of the coil portion forming a first gap section between the coil portion and first section, and wherein the second portion further comprises a second section that is arranged in the second angular space section with respect to the axis of rotation, wherein the second section has a second actuation face facing toward the coil portion forming a second gap section between the coil portion and the second actuation face, wherein a magnetic field generated by the magnetic assembly extends from the first section of the first portion via the first gap section to the first section of the second portion and from the second section of the second portion via the second gap section to the second section of the first portion, such that a magnetic field extends through the one or more coils of the coil portion in a fashion that allows for generating an Lorentz-force for moving the coil portion, when an electric current is provided to the one or more coils.

This embodiment provides a more powerful device, as the magnetic portion comprises a second portion that may comprise magnetic elements, such as magnets as well.

According to another embodiment of the invention, the first section and the second section of the first portion of the magnetic assembly each comprise a permanent magnet, wherein the magnets have opposite orientations with regard to their magnetic poles, and particularly wherein the first section and the second section of the second portion of the magnetic assembly each comprise a permanent magnet, wherein the permanent magnets have opposite orientations with regard to their magnetic poles, wherein the magnets comprised in the first section of the first and the second portion have the same orientation with regard to their magnetic poles and wherein the magnets comprised in the second section of the first and the second portion have the same orientation with regard to their magnetic poles.

According to another embodiment of the invention, the magnetic assembly comprises a first return portion that extends between, particularly connects the first and the second section of the first portion and wherein the magnetic assembly comprises a second return portion that extends between, particularly connects the first and the second section of the second portion, particularly wherein the first and/or the second return portion comprise a compound with a magnetic permeability of greater than one, particularly wherein the first and/or second return portion comprises a ferromagnetic compound.

According to another embodiment of the invention, the one or more coils are electrically contacted via the bearing assembly that comprises an electric contacting for the one or more coils such that an electric current can be provided to the one or more coils, particularly wherein the electrical contacting is arranged at or in the first and/or the second bearing.

The electrical contacting may also be comprised in the support or the elastic structure of the bearing assembly.

Further, the device may comprise a controller for controlling an electrical current supplied to the one or more coils.

According to another embodiment of the invention, the controller is configured to supply each coil of the coil portion independently with different electrical currents.

According to another embodiment of the invention, the substrate comprises a planar reflective layer.

In the following alternative embodiments are disclosed having the magnetic assembly arranged on the tiltable portion and the coil portion arrange don the fixed portion.

Terms and definitions provided for previous embodiments as far as they can be applied to the alternative geometry apply as well.

According to another embodiment of the invention, the magnetic assembly is comprised by the tiltable portion and the coil portion is comprised by the tiltable portion.

This embodiment provides a better separation and decoupling of the heat generating coil portion from the substrate, which may enhance optical performance.

Further, an electrical contacting of the tiltable portion may be omitted as the coils are on the fixed portion, which renders the contacting less complex and robust.

According to another embodiment of the invention, wherein the fixed portion comprises a compound with a magnetic permeability of greater than one, particularly wherein the base portion comprises a ferromagnetic compound such as iron.

This allows for a concentrating a magnetic flux generated by the coil portion, which in turn allows for improved performance of the device.

According to another embodiment of the invention, the magnetic assembly extends away from the reflective layer into the actuation space at least partially along an imaginary curved surface, particularly a cylindrical surface, centered around the at least one axis of rotation. In particular, the magnetic assembly comprises a surface on a side facing away from the reflective layer, wherein said surface extends along a cylindrically shaped plane. In other words, the said surface is bent in a single direction, wherein the bending radius of the surface is essentially constant.

This embodiment allows for arranging the components of the actuator assembly in a compact fashion in the actuation space.

According to another embodiment of the invention, the magnetic assembly comprises a north pole and a south pole that are separated along the middle plane of the tiltable portion. In particular, the magnetic assembly is magnetized along the x-axis of the Cartesian coordinate system associated to the tiltable portion.

According to an alternative embodiment, the magnetic assembly comprises two compartments, wherein the two compartments are magnetized along a magnetization axis respectively. The magnetization axes extends from a southpole to a northpole or vice versa. The magnetization axes extend radially away from the axis of rotation towards the actuation space at an angle with respect to each other, in particular at an angle of essentially 120°. In particular, in a non-tilted state, the first section of the coil portion is assigned to one compartment by being arranged on one magnetization axis and the second section of the coil portion is assigned to the other compartment by being arranged on the other magnetization axis. Preferably, at a maximum tilt the magnetizations axes do not overlap with the non-assigned first or second coil section respectively. For example, the magnetization axes extend at an angle of at most 120° with respect to each other. In particular, the two compartments are magnetized in opposite directions along their respective magnetization axis, wherein the southpole of one compartment faces away from the axis of rotation and the northpole of the other compartment faces away from the rotational axis.

Preferably, the angle of the magnetization direction with respect to each other corresponds to an angle of the first section of the coil portion with respect to the second section of the coil portion.

According to another embodiment of the invention, the coil portion is arranged radially further away from the axis of rotation than the magnetic assembly, wherein in the coil portion comprises a first section that is arranged in a (the) first angular space section with respect to the axis of rotation, wherein the first section of the coil portion has a first actuation face facing toward the magnetic assembly forming a first gap section between the magnetic assembly and the first section, and wherein the coil portion further comprises a second section that is arranged in a second angular space section with respect to the axis of rotation. The the second section of the coil portion has a second actuation face facing toward the magnetic assembly forming a second gap section between the magnetic assembly and the second actuation face, such that the first section of the coil portion is closer to the north pole and the second section of the coil portion is closer to the south pole. The conductor of the one or more coils is arranged such in the first section of the coil portion that a supplied electric current flows in the opposite direction than in the second section of the coil portion, such that a Lorentz-force for moving the tiltable portion is generated, when an electric current is provided to the one or more coils of the coil portion.

According to an alternative embodiment of the invention, a south pole of the magnetic assembly is separated from a north pole of the magnetic assembly along a plane parallel to the main extension plane of the substrate.

This embodiment provides a magnetic flux that essentially points along the optical axis of the tiltable portion. The one or more coils in the coil portion have to be arranged with the winding axes in order to be able to generated a Lorentz force suited to tilt the tiltable portion.

According to another embodiment of the invention, the coil portion is arranged radially further away from the axis of rotation than the magnetic assembly, wherein a winding axis of the one or more coils of the coil portion extends perpendicular to the axis of rotation along an x-axis of the fixed portion, particularly wherein the conductor of the one or more coils extends from a first section of the coil portion that is arranged in a first angular space section with respect to the axis of rotation to a second section of the coil portion that is arranged in a second angular space section with respect to the axis of rotation, such that a Lorentz-force for moving the tiltable portion is generated, when an electric current is provided to the one or more coils of the coil portion.

According to one embodiment, in the first section of the coil portion and in the second section of the coil portion the conductor extends essentially parallel to the axis of rotation. Further sections of the coil portions may be arranged to electrically connect the first section of the coil portion and the second section of the coil portion. In particular, the said further sections of the coil portion extend along a cylindrically shaped imaginary surface.

According to another embodiment of the invention, the coil portion comprises a solid core around which the conductor of the one or more coils is wound.

The solid core may comprise or consists of a compound with a magnetic permeability of greater than one, particularly wherein the base portion comprises a ferromagnetic compound, such as iron.

This allows for an increased magnetic flux in the coil portion and thus an improved performance of the device.

According to another embodiment of the invention, the solid core in the first section has a first actuation face facing toward the magnetic assembly forming a first gap section between the magnetic assembly and the first section, wherein the solid core in the second section has a second actuation face facing toward the magnetic assembly forming a second gap section between the magnetic assembly and the second actuation face.

According to one embodiment the bearing assembly comprises a roller bearing which is at least partially arranged between the fixed portion and the tiltable portion. In particular, the axis of rotation extends in the reflective layer. For example, the roller bearing comprises a first cage element which is fixedly attached to the tilting portion and a second cage element which is fixedly attached to the fixed portion, and a rolling element which is arranged between the first cage element and the second cage element. In particular, the first and second cage element or the rolling element comprise multiple rotationally symmetric elements which enable relative motion of the first cage, the second cage and the rolling element. The rotationally symmetric elements may have a ball shape, needle shape, a cylinder shape, a ton shape or a cone shape, wherein the rotationally symmetric elements are arranged to rotate around their axis of rotational symmetry. In particular, the first cage element and the second cage element have a curved shape, which extends along an imaginary cylindrical surface, wherein the imaginary cylindrical surface extends around the axis of rotation.

According to one embodiment the tiltable portion is moved out of its equilibrium state by means of the Lorentz-force, and a restoring force is arranged to move the tiltable portion back to the equilibrium state, wherein the actuator assembly is arranged such that the amount of maximum Lorentz force and the restoring force are the same at a maximum tilt angle of the tiltable portion. The restring force may depend on the magnetic attraction between the fixed portion and the tiltable portion. Furthermore, the elastic elements connecting the fixed portion and the tiltable portion may contribute to the restoring force. Advantageously, dimensioning the actuator assembly so that the amount of maximum Lorentz force and the restoring force are the same at a maximum tilt angle of the tiltable portion allows to hold the tiltable portion at the maximum tilt angle. Additionally, dimensioning the Lorentz force and the restoring force as specified, enables a very low energy consumption in a dynamic mode of the device, where the tilting portion is deflected in an oscillating manner, because at the maximum tilt angle the direction of the Lorentz force may be switched to act in the same direction as the restoring force.

BRIEF DESCRIPTION OF THE DRAWINGS

Particularly, exemplary embodiments are described below in conjunction with the Figures. The Figures are appended to the claims and are accompanied by text explaining individual features of the shown embodiments and aspects of the present invention. Each individual feature shown in the Figures and/or mentioned in said text of the Figures may be incorporated (also in an isolated fashion) into a claim relating to the device according to the present invention.

DETAILED DESCRIPTION

Figure 1:
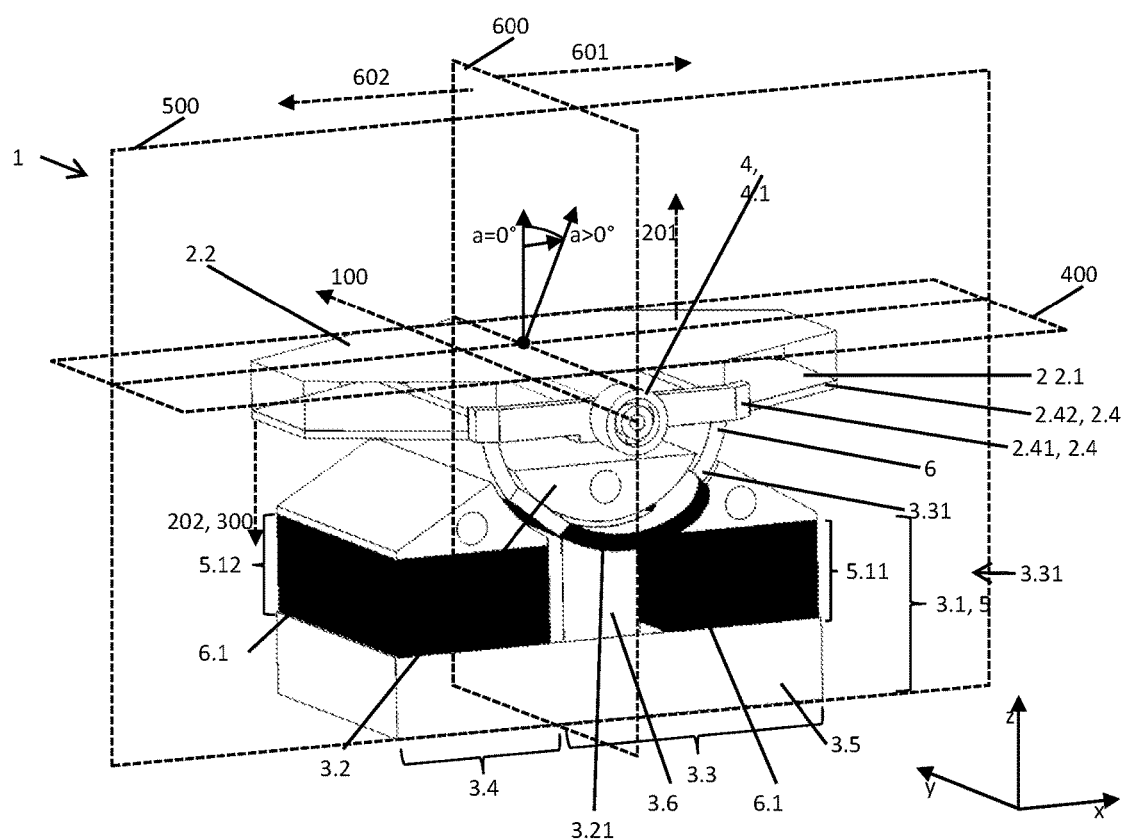
FIG. 1 shows a three-dimensional view of a first embodiment of the invention.

In FIG. 1. A three-dimensional view of a first embodiment of a device 1 according to the invention is shown. The device 1 comprises a tiltable portion 2 and a fixed portion 3. The tiltable portion 2 is arranged tiltably with respect to the fixed portion 3. The tiltable portion 2 tilts or rotates around an axis of rotation 100. Said axis of rotation might be an imaginary axis or it might be a physical axis comprising axis members that facilitate rotation around the axis of rotation 100.

In use, the fixed portion 3 remains stationary wherein the tiltable portion 2 rotates or tilts around the axis of rotation 100.

For this purpose, the device 1 further comprises a bearing assembly 4 that mechanically connects the fixed portion 3 to the tiltable portion 2. The bearing assembly 4 is configured to mount the tiltable portion 2 on the fixed portion 3. Ideally, the bearing assembly 4 is arranged at least one of the two ends of the axis of rotation 100.

In the example shown, the tiltable portion 2 adopts a tilt angle of 0°. This position is also referred to as the equilibrium state of the device 1. The equilibrium state of the device 1 is particularly adopted, when no electric current is provided to the device 1 and no inertial forces are acting on the tiltable portion 2.

As a convention in this specification, the axis of rotation 100 extends along a y-axis of a Cartesian coordinate system associated to the tiltable portion 2. Further, the axis of rotation 100 extends also along a y-axis of a Cartesian coordinate system associated to the fixed portion.

The tiltable portion 2 comprises a substrate 2.1 having a reflective layer 2.2 for reflecting visible light but it could be used for reflecting light at different wavelength as well, such as to cover also the non-visible spectral region. For this purpose, the reflective layer 2.2 may comprise a reflective metal compound, such as silver, gold, and/or aluminum.

The substrate 2.1 and the reflective layer 2.2 may form a mirror element. The tiltable portion 2 in FIG. 1 further comprises a receptacle 2.4 in which the mirror element 2.3 is mounted. The receptacle 2.4 is connected to the bearing assembly 4 and comprises a bracket 2.41 holder on each side along the axis of rotation that hold the substrate 2.1. The receptacle 2.4 further comprises a solid layer 2.42 integrally formed with the bracket holders 2.41, wherein said layer 2.42 comprises a thermally insulating material that is arranged on a side of the substrate that is opposite to the reflective layer 2.2. The solid layer 2.42 further serves as a support for the mirror element. The thermal insulation of the solid layer 2.42 protects the mirror element from heat originating from actuating the mirror element.

The reflective layer 2.2 of the tiltable portion 2 faces toward a first side 201 from which light to be reflected by the mirror element impinges on the reflective layer 2.2. This first side 201 corresponds to the first side 201 of the tiltable portion 2. Opposite the first side 201, the reflective layer 2.2 faces toward a second side 202, which in this example corresponds to the side on which the reflective layer 2.2 is attached to the substrate 2.1. The second side 202 corresponds to the second side of the tiltable portion 2. The substrate 2.1 may be formed from a suitable, light-weight polymer.

In the example of FIG. 1, the reflective layer 2.2 is planar and extends along a main extension plane 400. This plane 400 extends along the y-axis of the Cartesian coordinate system (depicted with three arrows labeled with x, y and z) associated to the tiltable portion and further comprises an x-axis of this coordinate system (here it is assumed that the coordinate system has its point of origin O centrally arranged on the reflective layer 2.2). A corresponding z-axis of this coordinate system extends perpendicularly from the main extension plane particularly towards the first side of the reflective layer 2.2. In this example, the z-axis corresponds to the optical axis of the device 1.

The coordinate system of the tiltable portion tilts with the tiltable portion 2, that is the orientation of the coordinate system associated to the tiltable portion 2 relative to the coordinate system associated to the fixed portion depends on the tilt angle a of the tiltable portion 2. Particularly, at a tilt angle of a=0°, the coordinate systems of the tiltable portion 2 and the fixed portion 3 have the same orientation. For this reason, only one coordinate system is depicted in FIG. 1.

In addition to the Cartesian coordinate systems, it is suitable to define also a cylindrical coordinate system. For this cylindrical coordinate system, the cylinder axis lies on the axis of rotation 100, wherein the angular coordinate corresponds to the tilt angle a of the tiltable portion 2. The angular coordinate of a=0° corresponds to the direction of the z-axis of the fixed portion 3. Whenever the tiltable portion 2 tilts out of the equilibrium state, the angular coordinate may describe the tilted state by means of a tilt angle a, which along one direction of tilting may be measured in positive values and along the opposite direction of tilting may be measured in negative values. The radial coordinate and radial direction of the cylindrical coordinate system is given by a distance to the axis of rotation 100.

In this example, the axis of rotation 100 extends essentially through the substrate 2.1 of the tiltable portion 2 and the center of mass of the tiltable portion 2 is located on the axis of rotation 100.

For describing the locations and orientations of the components of the device 1 an imaginary central plane 500 may be defined, wherein said central plane 500 extends perpendicular to the axis of rotation 100 and intersects with the axis of rotation 100 at a central middle point O' (close to the origin of the coordinate system) of the axis of rotation 100 that symmetrically divides the axis of rotation 100, the substrate 2.1 and/or the receptacle 2.4 along the axis of rotation 100.

According to the invention, the device 1 further comprises an actuator assembly essentially consisting of two components, namely a coil portion 6 and a magnetic assembly 5. One of the two components is arranged on the tiltable portion 2, wherein the other of the two components is arranged on the fixed portion 3. In the example of FIG. 1, the coil portion 6 is arranged on the tiltable portion 2, wherein the magnetic assembly 5 is arranged on the fixed portion 3.

The actuator assembly as a whole is arranged "behind" the reflective layer 2.2 in an actuation space 300. Particularly, the actuator assembly does not completely surround the axis of rotation 100, but only a portion of said axis 100, which allows a compact design of the device 1, as the actuator assembly is not arranged laterally shifted with respect to the axis of rotation.

The embodiment shown in FIG. 1 comprises a coil portion 6 that partially extends along an imaginary cylindrical surface that is centered at with its cylinder axis along the axis of rotation 100 of the device 1.

The coil portion 6 extends in a half-cylindrical fashion from the second side 202 of the substrate 2.21 towards the actuation space 300 of the device 1. The actuation space 300 is particularly a half-space that extends along the z-axis of the coordinate system associated to the tiltable portion onward from the second side of the substrate 2.21, i.e. toward a space, where the fixed portion 3 is located. Particularly, the actuation space 300 extends along the z-axis of coordinate system associated to the fixed portion 3 from the reflective layer 2.42 or substrate 2.1 toward the fixed portion 3.

Therefore, the coil portion 6—more generally the component of the actuator assembly that is arranged on the tiltable portion 2—is arranged only on one side of the substrate 2.1 and the axis of rotation 100.

The coil portion 6 in the example of FIG. 1 has the form of a curved band partially extending along the imaginary cylindrical surface. As the coil portion 6 is centered around the axis of rotation 100, the coil portion 6 only performs a rotating motion and no translatory motion.

The coil portion 6 comprises a coil 6.1 with a conductor, such as a wire. The coil 6.1 has coil axis pointing along the z-axis of the coordinate system associated to the tiltable portion 2 at all times. The coil axis is an imaginary axis of the coil 6.1 around which the conductor is wound and along which a main component of a magnetic field inducible by an electrical current provided to the coil 6.1 is oriented. The coil axis is also referred to as the winding axis in the current specification. Further, the coil 6.1 has a curved shape along an imaginary surface intersecting with the coil axis perpendicularly. This shape corresponds to the shape of the coil portion 6 and partially follows the imaginary cylindrical surface.

The coil 6.1 has a square-like cross-section (see also FIG. 3) along said imaginary cylindrical surface.

The coil portion 6 is connected to the thermally insulating solid layer 2.42 of receptacle 2.4 and therefore forms essentially a hollow half-cylindrical band centered around the axis of rotation 100 and extends into the actuation space 300.

In FIG. 1, the magnetic assembly 5 is arranged on or is comprised by the fixed portion 3. The fixed portion 3 is arranged radially further away from the axis of rotation 100 than the tiltable portion 2. The magnetic assembly 5 and thus in this example also the fixed portion 3 comprises a first portion 3.1 that comprises two permanent magnets 5.11, 5.12 of the magnetic assembly 5. One of the two magnets 5.11 is oriented with its magnetic poles parallel along the z-axis of the coordinate system of the fixed portion, wherein the other magnet 5.12 is oriented anti-parallel to said z-axis.

The magnetic assembly 5 and thus the fixed portion 3 comprises a first section 3.3 and a second section 3.4, wherein each section 3.3, 3.4 comprises one magnet of the two magnets 5.11, 5.12.

The first and the second section 3.3, 3.4 are arranged laterally shifted along the x-axis of the coordinate system of the fixed portion 3. The first section 3.1 is arranged in a first angular space section 601, wherein the second section 3.4 is arranged in a second angular space section 602.

The first angular space section 601 is located on a first side of an imaginary zero-degree plane 600 that comprises the axis of rotation 100 and extends along the z-axis of the coordinate system associated to the fixed portion 3. Accordingly, the second angular space section 602 is located on a second side opposite of the first side of the zero-degree plane 600. When the device is in its equilibrium position, i.e. assumes a tilt angle a=0°, the zero-degree plane 600 coincides with the middle plane of the tiltable portion. The middle plane may tilt with the tiltable portion 2 and extends through the axis of rotation 100 and in a tilted state of the tiltable portion 2 the middle plane encloses the tilt angle a with the zero-degree plane 600.

Each section 3.3, 3.4 of the first portion 3.1 has an actuation face 3.31, 3.32 that faces toward the curved coil portion 6. Particularly, said actuation faces extend partially along or parallel to the curved surface of the coil portion 6. Between the actuation faces 3.31, 3.32 and the coil portion 6 a gap section is formed. These gap sections are ideally comparably small and are just large enough to allow a rotation of the coil 6.1 portion relative to the fixed portion 3 and to allow for movements caused by external shocks, for thermal expansion and for manufacturing tolerances. The surfaces of the actuation faces 3.31, 3.32 therefore may follow a cylinder geometry in order to have a constant gap width between the coil portion 6 and the fixed portion 3/magnetic assembly 5.

At the actuation faces 3.31, 3.32, the conductor of the coil 6.1 in the coil portion 6 extends along the y-axis of the coordinate system associated to the fixed or the tiltable portion, such that when an electric current is provided to the coil 6.1, a resulting Lorentz-force will point along the x-direction inducing a torque on the tiltable portion 2 that will cause the tiltable portion 2 to tilt around the axis of rotation 100.

The two sections 3.3, 3.4 of the first portion 3.1 are connected at a base of the first portion 3.1 by means of a base portion 3.5 of the magnetic assembly 5. Said base portion 3.5 is formed from a material with a comparably high magnetic permeability (as compared to air) such that the magnetic field of the magnets 5.11, 5.12 is concentrated in the base portion 3.5.

The device 1 according to FIG. 1 further comprises a second portion 3.2 of the fixed portion 3, wherein said second portion 3.2 is arranged radially closer to the axis of rotation 100 than the coil portion 6. The second portion 3.2 is therefore arranged in the hollow space formed between the curved band of the coil portion 6 and the solid layer 2.42 of the receptacle 2.4.

The second portion 3.2 is supported by a support structure 3.6 that extends from the first portion 3.1, particularly from the base portion 3.5, toward the axis of rotation 100 through an opening of the coil 6.1 comprising the coil axis. Thus, the support structure 3.6 is essentially centrally arranged in the device 1. The support structure 3.6 limits the rotation of the coil portion 6 and may serve as a hard stop.

The second portion 3.2 is arranged on top of the support structure 3.6 and comprises a second portion face 3.21 that faces towards the coil portion 6 and particularly has a shape partially following the imaginary cylindrical surface. The second portion 3.2 extends in both angular space sections 601, 602 and may be formed from a solid piece of a material having a comparably high magnetic permeability (as compared to air). The second portion 3.2 may be formed as a cylinder section.

Between the second portion face 3.21 and the coil portion 6 another gap is formed allowing the coil portion 6 to rotate with respect to the second portion 3.2.

The second portion 3.2 allows to concentrate the magnetic flux of the device 1 in the vicinity of the coil portion 6.

In the vicinity of the coil portion 6, the fixed portion 3, particularly the first and the second portion 3.1, 3.2, has/have cooling channels 7 configured to transport a liquid or gaseous coolant for transporting away heat generated at the coil portion 6 due to electrical currents provided to the coil 6.1. These cooling channels 7 may extend partially along the y-axis of the fixed portion 3.

The device 1 further comprises a bearing assembly 4 that is configured to support the tiltable portion 2 on the fixed portion 3. There are several embodiments for suitable bearing assemblies disclosed in the specification of the invention. Particularly, suitable bearing assemblies 4 are disclosed in the specification in separate embodiments.

In FIG. 1, the bearing assembly 4 comprises two bearings 4.1, 4.2 each arranged at one end of the axis of rotation 100, such that the tiltable portion 2 is rotatably mounted on the fixed portion 3.

An electric current may be provided to the coil 6.1 in the coil portion 6 via the bearing assembly 4 by means of an electrical contacting (not shown).

Figure 2:
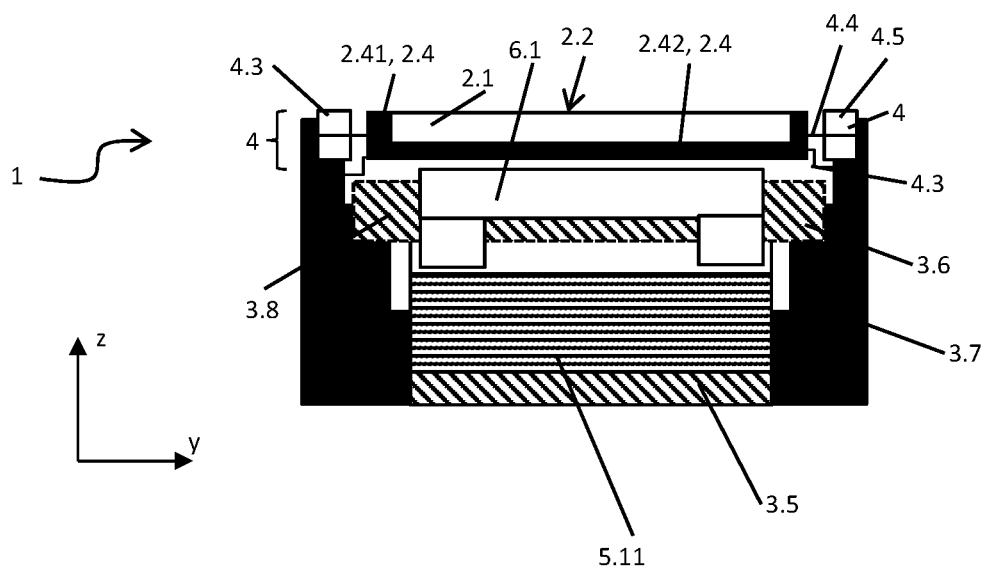
FIG. 2 shows a cross-sectional view of a tiltable mirror device similar to the first embodiment.

In FIG. 2 a similar embodiment is shown a sin FIG. 1. Therefore, reference numerals are identical for identical or similar components or features of the device 1. Also, in order to avoid unnecessary redundancy, emphasis is put to differing features and components, while essentially identical features and components of FIG. 1 are not reiterated in this paragraph but do apply to the embodiment of FIG. 2 as well.

In addition to the embodiment shown in FIG. 1, in FIG. 2 a housing structure 3.7 is depicted that is part of the fixed portion 3. The housing structure 3.7 supports the bearing assembly 4 on the side of the fixed portion 3.

The bearing assembly 4 comprises two portions each in form of a beam 4.4 protruding along the axis of rotation 100. The two portions 4.4 are formed is a shafts or pins that are supported on the side of the fixed portion by means of a grove 4.5 in which the shafts extend to.

Further, the bearing assembly 4 comprises two elastic structures in form of spring elements 4.3 that are connected on one side to the fixed portion 3, namely the housing structure 3.7 and on the other side to the receptacle 4 of the substrate 2.1. The elastic structures 4.3 provide a pre-load, such that the equilibrium state is well-defined and such that a restoring force is generated, when the tiltable portion 2 assumes a title angle different to a=0°.

In contrast to the embodiment shown in FIG. 1, the second portion 3.2 of the fixed portion 3 is supported on the housing structure 3.7 that forms the support structure 3.6 of the second portion 3.2. Thus, the support structure 3.6 does not extend through an opening of the coil 6.1 but extends along the axis of rotation 100 laterally further to be supported by the housing structure 3.7. On the second portion 3.2 a printed-circuit board 3.8 is arranged.

The printed-circuit board 3.8. comprises a sensor (not shown) configured to provide a feedback on the rotational position, i.e. a tilting state of the tiltable portion 2.

Further, the printed-circuit board 3.8 may comprise a temperature sensor (not shown), a non-transitory memory (not shown), such as an EEPROM to store device specific operating parameters.

Figure 3:
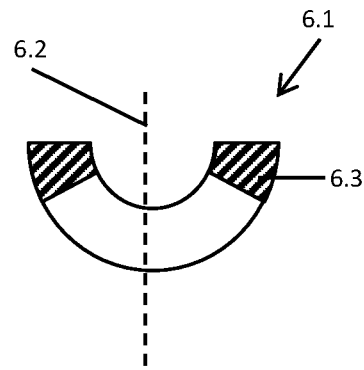
FIG. 3 shows a curved coil.

In FIG. 3 a representation of the coil 6.1 of the embodiment of FIGS. 1 and 2 is shown. The coil 6.1 comprises coil axis 6.2 and a conductor 6.3 with copper wires that are arranged circumferentially around the coil axis 6.2. As such, the coil 6.1 may be referred to as a flat coil. However, the coil 6.1 is curved along an imaginary cylindrical surface and therefore adopts an extension partially along said cylindrical surface. The conductor 6.3 is arranged in the cylindrical plane. A coil 6.1 having this shape is particularly well-suited for the device 1 according to the invention.

Figure 4A:
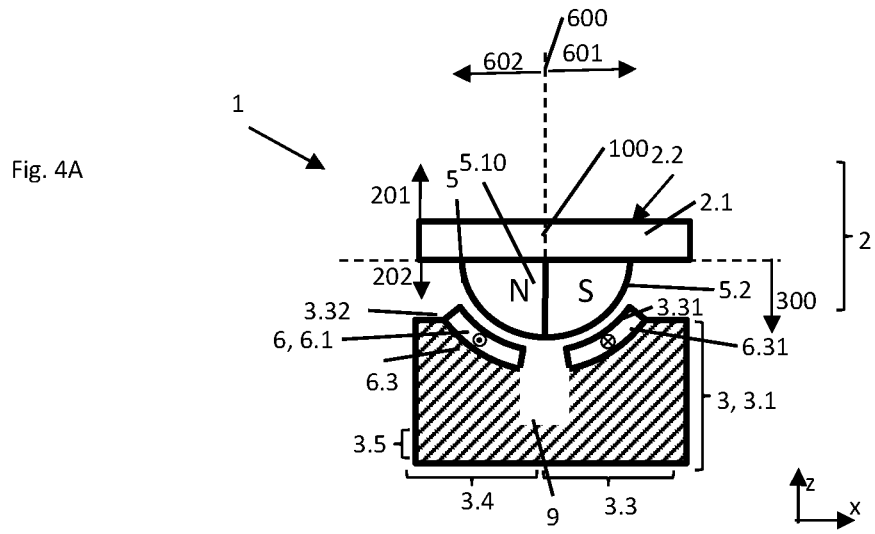
FIGS. 4*a*-4*c* show three variations of a second embodiment of the device.
Figure 4B:
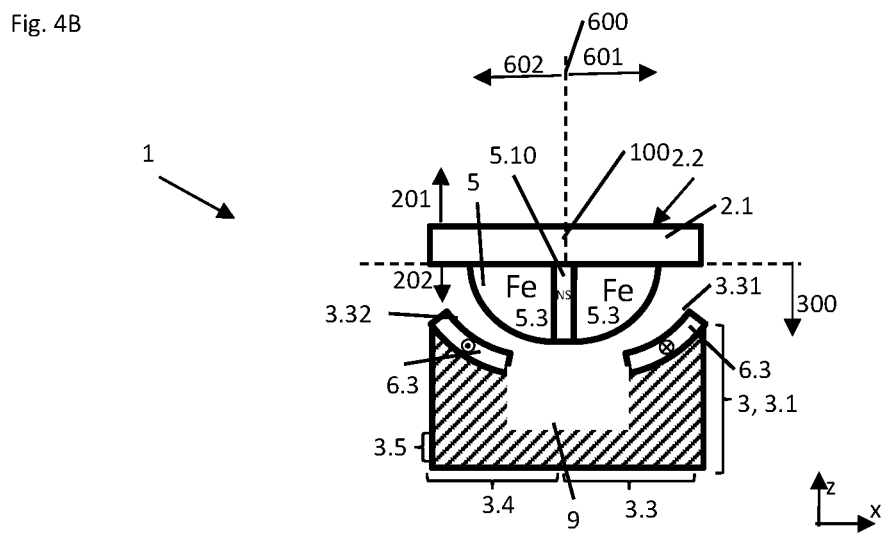
Figure 4C:
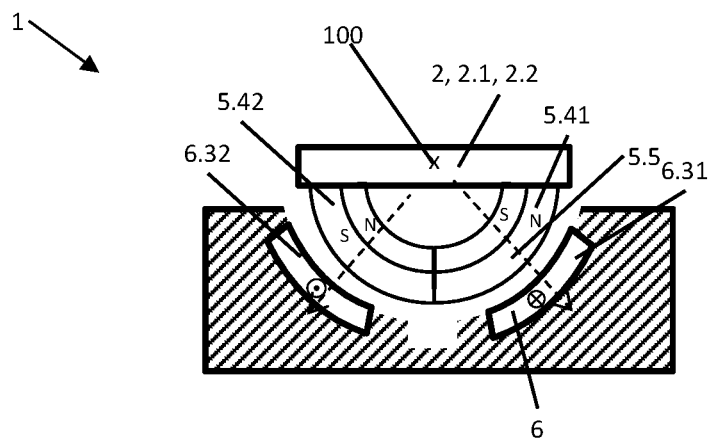
Figure 5A:
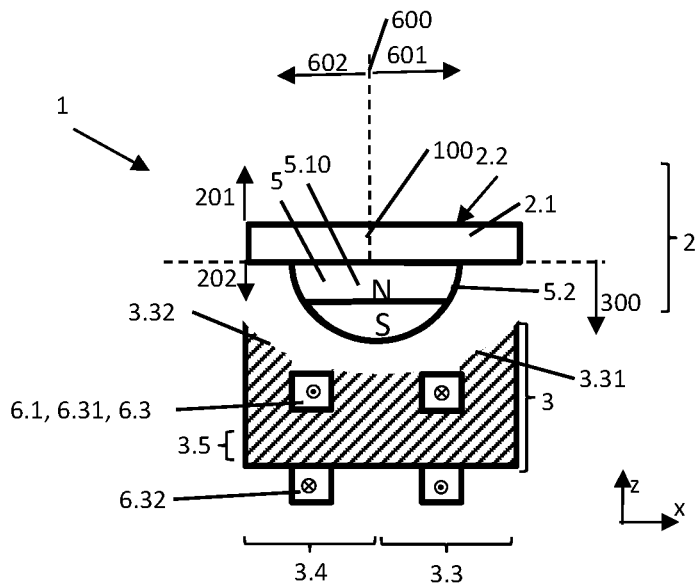
FIGS. 5*a* and 5*b* show two variations of a third embodiment of the invention.
Figure 5B:
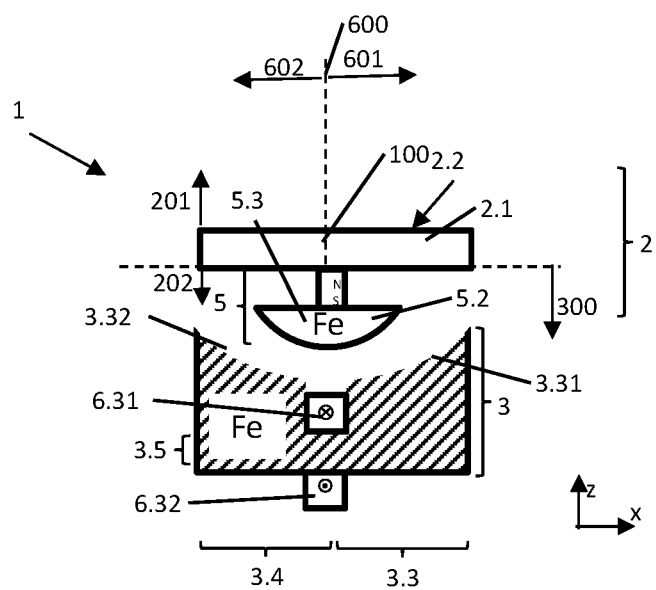

In FIG. 4A, FIGS. 4B and 4C as well as in FIGS. 5a and 5B various different embodiments of the device 1 are shown. In contrast to the embodiment of FIGS. 1 and 2, these embodiments have the magnetic assembly 5 arranged on the tiltable portion 2 and the coil portion 6 arranged on the fixed portion 3.

Similar or identical features and components are referenced with the same reference numerals and may not be elaborated again, but the reader is referred to the description of previously described embodiments of the specification.

In FIG. 4A and FIG. 4B, the magnetic assembly 5 is arranged such on the tiltable portion 2 that it extends into the actuation space 300 and has its magnetic poles N, S arranged along an x-axis of the coordinate system associated to the tiltable portion 2.

The magnetic assembly 5 in FIG. 4A consists of a single permanent magnet 5.10 that has an actuation face 5.2 that extends along the cylindrical surface centered around the axis of rotation 100. Therefore, the magnet 5.10 is essentially formed as a solid half-cylindrical component attached to the solid layer 2.42 of the receptacle 2.4 or the substrate 2.1.

Opposite the actuation face 5.2 of the magnet assembly 5 the fixed portion 3 comprising the coil portion 6 is arranged in the actuation space 300 having actuation faces 3.31, 3.32 facing (a first and a second actuation face) toward the magnetic assembly 5 and having essentially the same or at least partially the same shape as the actuation face of the magnetic assembly 5, such that gap between the fixed portion 3 and the tiltable portion 2 is formed.

The fixed portion 3 comprises a first section 3.3' comprised in the first angular space section 601, wherein a first conductor section 6.31 of the coil 6.1 is arranged at the first actuation face 3.31' of the fixed portion 3, wherein the first conductor section 6.31 extends along the axis of rotation 100 at the actuation face 3.31'.

Similarly, the fixed portion 3 comprises a second section 3.4' comprised in the second angular space section 602, wherein a second conductor section 6.32 of the coil 6.1 is arranged at the second actuation face 3.32' (that is located in the second section 3.4') of the fixed portion 3, wherein the second conductor section 6.32 extends along the axis of rotation 100 at the second actuation face 3.32', but such that when a current is provided to the coil 6.1, the current in the second conductor section 6.32 flows in the opposite direction than the current in the first conductor section 6.31.

The fixed portion 3 comprises a recess 9 at an angular direction of 180° (i.e. at a theoretical tilt angle of 180°, which the device cannot assume), configured and arranged to guide the magnetic field of the magnetic assembly 5 such as to achieve a desired direction and strength of the magnetic flux through the coil in which an air flow may be facilitated in order to provide a means of heat convection away from the coil portion 6.

The fixed portion 3 in FIG. 4A and FIG. 4B comprises a base portion 3.5 that connects the first and the second section 3.3', 3.4' of the fixed portion 3 at a bottom portion of the device 1.

Further, the fixed portion 3 particularly in the vicinity of the coil portion 6 may comprise cooling channels (not shown) for transporting a coolant. The fixed portion 3 may be made of iron (Fe).

A similar embodiment to the embodiment of FIG. 4A is shown in FIG. 4B. In contrast, to FIG. 4A, the magnetic assembly 5 comprises separate ferromagnetic, here iron portions 5.3. Further, the surface 5.2 of the magnetic assembly 5 facing inward the actuation space 300 extends not along a surface of a cylinder having a circular base area, but along a cylinder having an oval base area.

The shape of the fixed portion 3, particularly the actuation faces 3.31', 3.32' of the fixed portion 3/coil portion 6 may be formed accordingly or identical to the embodiment of FIG. 4A or the surface 5.2 of the magnetic assembly 5.

In FIG. 4C, the magnetic assembly 5 comprises two compartments 5.41, 5.42, wherein the two compartments are magnetized along a magnetization axis 5.5 respectively. The magnetization axes 5.5 extend from a southpole to a northpole or vice versa. The magnetization axes 5.5 extend radially away from the axis of rotation 100 towards the actuation space 300 at an angle with respect to each other, in particular at an angle of essentially 120°. In particular, in a non-tilted state, the first section 6.31 of the coil portion 6 is assigned to one compartment 5.41 by being arranged on its magnetization axis 5.5 and the second section 6.32 of the coil portion 6 is assigned to the other compartment 5.42 by being arranged on the other magnetization axis 5.5. Preferably, at a maximum tilt the magnetizations axes 5.5 do not overlap with the non-assigned first 6.31 or second coil section 6.32 respectively. For example, the magnetization axes 5.5 extend at an angle of at most 120° with respect to each other. In particular, the two compartments 5.41, 5.42 are magnetized in opposite directions along their respective magnetization axis 5.5, wherein the southpole of one compartment 5.41 faces away from the axis of rotation 200 and the northpole of the other compartment 5.42 faces away from the rotational axis 100.

Preferably, the angle of the magnetization direction with respect to each other corresponds to an angle of the first section of the coil portion with respect to the second section of the coil portion.

In comparison to the embodiments of FIG. 4, in FIG. 5A and FIG. 5B the poles of the magnetic assembly 5 are oriented along the z-axis of the coordinate system associated to the tiltable portion 2.

The surface 5.2 of the magnetic assembly 5 facing towards the actuation space 300 is similar to the surface of the embodiment in FIG. 4B, namely extending partially along an imaginary cylindrical surface having an oval base area. The magnetic assembly 5 as a whole is therefore formed essentially as a solid half-cylindrical component.

The embodiment in FIG. 5A has a magnetic assembly 5 consisting of a single permanent magnet 5.10.

The coil portion 6 is arranged at the fixed portion 3. However, due to the different orientation of the magnetic poles N, S as compared to the embodiments of FIG. 4, the coils 6.1 in the coil portion 6 are arranged colinear with their coil axis oriented along the x-axis of the coordinate system associated to the fixed portion 3. The coil portion 6 in the example shown comprises two coils 6.1 that are arranged in the first and the second section 3.3', 3.4' of the fixed portion 3 respectively.

The conductors 6.3 extend parallel to the central plane 600 or the axis of rotation 100 perpendicular to the coil axes in a vicinity of the magnetic assembly 5.

A winding direction of the conductors 6.3 of both coils 6.1 is the same, so that in a first conductor section 6.31 that extends on an actuation face 3.31', 3.32' of the fixed portion 3 an electric current flows in the same direction, here parallel or antiparallel the axis of rotation 100, such that the direction of the electrical current, i.e. the first conductor section 6.31 on the actuation face 3.31', 3.32' of the fixed portion 3 and the magnetic flux of the magnet 5.10 of the magnetic assembly 5 is essentially perpendicular such that the Lorentz force generated may be maximized.

A second conductor section 6.32 extends in the other direction at a base portion 3.5 of the device 1. The conductor 6.3 of the coils 6.1 is wound around a solid compound of the fixed portion 3, wherein the solid compound preferably has a high magnetic permeability. Compounds comprising or consisting of iron may be suitable.

In FIG. 5B a similar embodiment as in FIG. 5A is shown. In contrast to FIG. 5A, the magnetic assembly 5 has a mushroom-shaped cross-section along the central plane 500. The mushroom-shaped magnetic assembly 5 is oriented with a mushroom head portion 5.3 radially further away than with a mushroom stem portion, i.e. "upside down".

The mushroom head 5.3 portion comprises or consists of iron wherein the mushroom stem comprises a permanent magnet 5.10 having its magnetic poles N, S oriented along a z-axis of the coordinate system associated to the tiltable portion 2. The outer face 5.2 of the mushroom head portion 5.3 defines a gap geometry in relation to the fixed portion 3 and allows the tiltable portion 2 to rotate around the axis of rotation 100 without collision with the fixed portion 3 which surface is formed correspondingly.

The magnetic assembly 5 therefore provides a particularly light-weight embodiment of the magnetic assembly 5.

The fixed portion 3 comprises the coil portion 6, wherein the coil portion 6 consists of a single coil 6.1 only. The coil axis is oriented along the x-axis of the coordinate system associated to the fixed portion 3. Similar to FIG. 5A, the conductor 6.3 is wound along the zero-degree plane 600—in the embodiment of FIG. 5B, the conductor 6.3 extends on the zero-degree plane, colinear with the orientation of the magnetic poles N, S of the magnet 5.10.

Figure 6:
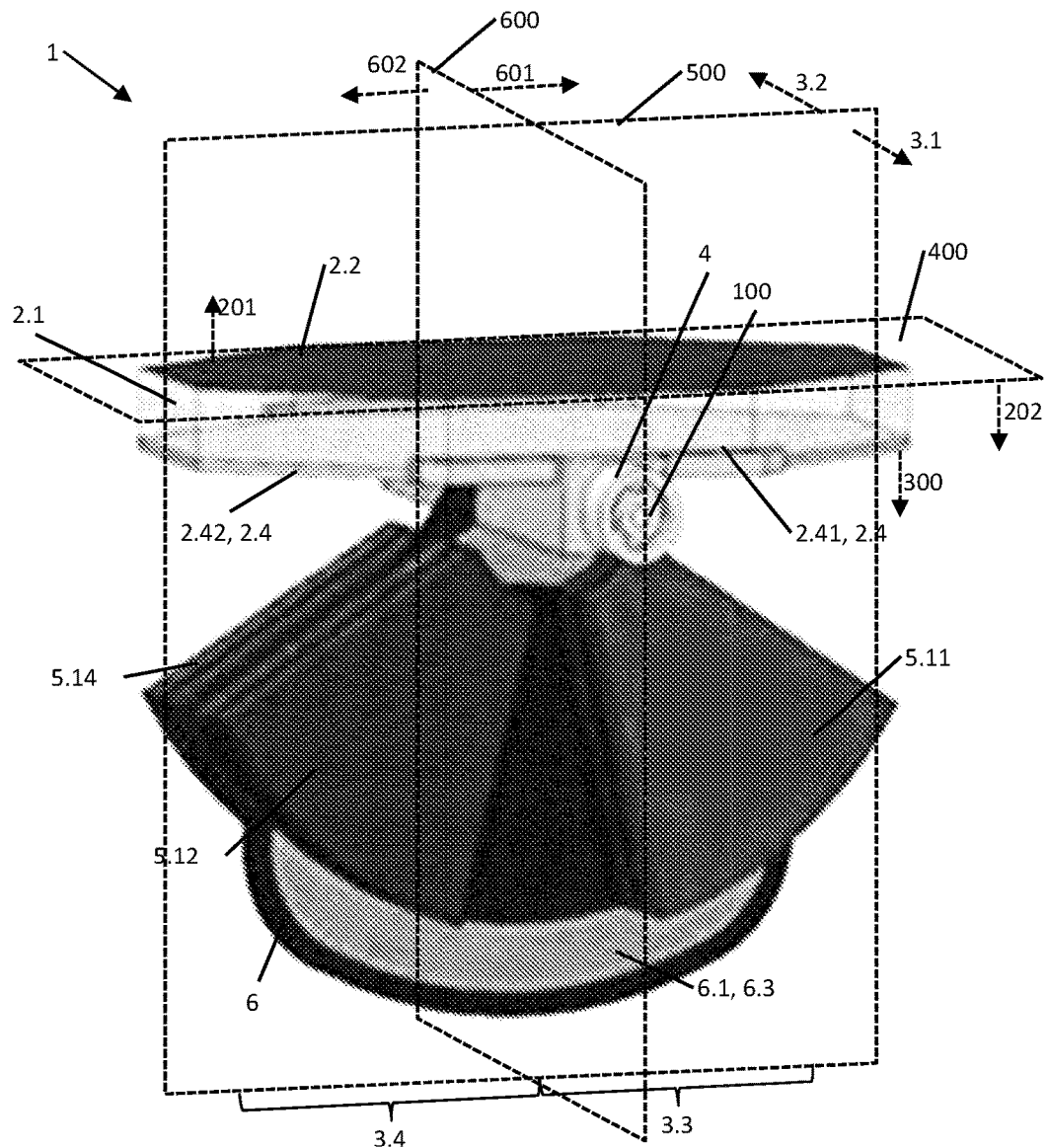
FIG. 6 shows a fourth embodiment of the invention.

In FIG. 6 an alternative embodiment of the device 1 is shown that particularly differs from the previous embodiments with regard to the direction of the magnetic flux relative to the axis of rotation 100.

While in the embodiments of FIGS. 1, 2 and 4 the magnetic portion 5 is arranged such that a magnetic flux for evoking a Lorentz Force essentially extends along a radial direction through the coil portion 6, in the embodiment of FIG. 6 the magnetic flux essentially extends along the axis of rotation 100 through the coil portion 6.

The device in FIG. 6 comprises a planar disc-like coil portion 6 that extends planar on the central plane 500 perpendicular to the axis of rotation 100.

The coil portion 6 comprises a coil 6.1 that circumferentially extends along the disc-shaped coil portion 6 at a rim portion of the disc.

The coil portion 6 has an essentially trapezoid shape along the central plane 500.

The coil portion 6 comprises two actuation rim portions (covered by, i.e. not visible due to the magnets 5.12 and 5.11) that starting from the axis of rotation 100 enclose opposite angles with the zero-degree plane 600 along the angular coordinate direction of the cylindrical coordinate system and extend symmetrically radially along said angles, such that each actuation rim portion forms an essentially straight rim portion of the coil portion 6.

At a bottom rim portion the coil portion 6 connects said to actuation rim portions.

The conductor 6.3 of coil 6.1 comprised in the coil portion 6 is arranged along the actuation rim portions and the bottom rim portion.

The coil axis is oriented along the axis of rotation 100 but is located radially inward into the actuation space 300 along the z-axis of the coordinate system associated to the tiltable portion 2 at a 0° (or more precisely a 180°) angular position.

The magnetic assembly 5 is arranged on the fixed portion 3 and is configured to exhibit a magnetic flux at the coil portion 6 extending essentially along the axis of rotation 100.

The magnetic assembly 5 comprises four separate permanent magnets 5.11, 5.12, 5.14 having their magnetic poles oriented along the axis of rotation 100. One magnet is not visible due to the perspective view.

The magnetic assembly 5 comprises a first and a second portion 3.3, 3.5. The first portion 3.1 of the magnetic assembly 5 is arranged on a first side of the central plane 500 (and thus on a first side of the planar coil portion), wherein the second portion 3.2 of the magnetic assembly 5 is arranged on a second and therefore opposite side of the central plane 500 (and thus on a second side of the planar coil portion).

The first portion 3.1 and the second portion 3.2 each comprise two magnets of the four magnets 5.11, 5.12, 5.14.

The first and the second portion 3.1, 3.2 each comprise a first and a second section 3.3. 3.4, wherein the first sections 3.3 are arranged in the first angular space section 601 and the second sections 3.4 are arranged in the second angular space section 602. The angular space sections have been defined previously in the specification.

Each section 3.3, 3.4 of the magnetic assembly 5 comprises one magnet of the four magnets.

The magnets 5.11 comprised in the first section 3.3 have their magnetic poles aligned to each other, wherein the magnets 5.12, 5.14 comprised in the second section 4.3 have their poles aligned with each other but in an opposite direction than the magnets 5.11 in the first section 3.3.

The magnets 5.11 in the first section 3.3 are arranged colinear along the axis of rotation 100 as well as the magnets 5.12, 5.14 in the second section 3.4.

It is noted that the actuation rim portions extend in different angular space sections 601, 602, such that the conductor 6.3 of the coil 6.1 extends between the colinear arranged magnets 5.12, 5.14, 5.11 in the first or second section 3.3, 3.4 respectively.

The bottom rim portion extends radially further away than the magnets 5.11, 5.12, 5.14 such that a magnetic flux through the bottom rim portion and the conductor 6.3 therein is diminished with respect to the actuation rim portions in which the Lorentz force is mainly induced, when the coil is provided with an electric current.

Parallel to the central plane 500, the magnets 5.11, 5.12, 5.14 have an essentially trapezoid shape in their cross-sections along said plane 500, wherein a main axis of the trapezoid shape is oriented at an angle that is identical to the angle of the actuation rim sections of the coil portion 6. Therefore, the magnets 5.11, 5.12, 5.14 cover an angular section (with respect to the angular coordinate of the cylindrical coordinate system) in which the magnetic flux is essentially constant such that actuation within this angular section may be achieved.

Figure 7:
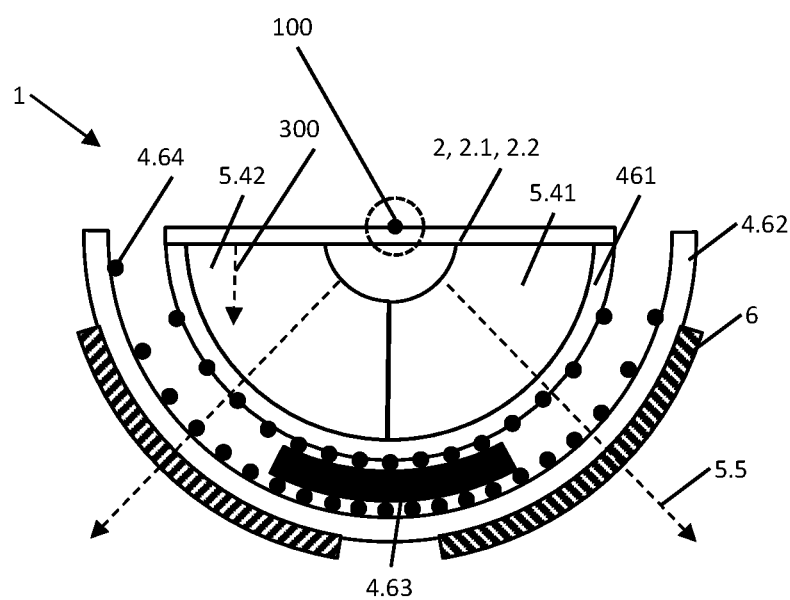
FIG. 7 shows a fifth embodiment of the invention.

In FIG. 7 a schematic sectional view of an exemplary embodiment is shown. In that embodiment, the bearing assembly 4 comprises a roller bearing which is at least partially arranged between the fixed portion 3 and the tiltable portion 2. The axis of rotation 100 extends in the reflective layer 2.2. For example, the roller bearing comprises a first cage element 4.61 which is fixedly attached to the tilting portion 2 and a second cage element 4.62 which is fixedly attached to the fixed portion 3, and a rolling element 4.63 which is arranged between the first cage element 4.61 and the second cage element 4.62. In particular, the first 4.61 and second cage element 4.62 or the rolling element 4.63 comprise multiple rotationally symmetric elements 4.64 which enable relative motion of the first cage 4.61, the second cage 4.62 and the rolling element. The rotationally symmetric elements 4.65 may have a ball shape, needle shape, a cylinder shape, a ton shape or a cone shape, wherein the rotationally symmetric elements 4.65 are arranged to rotate around their axis of rotational symmetry. In particular, the first cage element 4.61 and the second cage element 4.62 have a curved shape, which extends along an imaginary cylindrical surface, wherein the imaginary cylindrical surface extends at a constant distance around the axis of rotation 100.

The magnetic assembly 5 comprises two compartments 5.41, 5.42, wherein the two compartments are magnetized along a magnetization axis 5.5 respectively. The magnetization axes 5.5 extend from a southpole to a northpole or vice versa. The magnetization axes 5.5 extend radially away from the axis of rotation 100 towards the actuation space 300 at an angle with respect to each other, in particular at an angle of essentially 120°. In particular, in a non-tilted state, the first section 6.31 of the coil portion 6 is assigned to one compartment 5.41 by being arranged on its magnetization axis 5.5 and the second section 6.32 of the coil portion 6 is assigned to the other compartment 5.42 by being arranged on the other magnetization axis 5.5. Preferably, at a maximum tilt the magnetizations axes 5.5 do not overlap with the non-assigned first 6.31 or second coil section 6.32 respectively. For example, the magnetization axes 5.5 extend at an angle of at most 120° with respect to each other. In particular, the two compartments 5.41, 5.42 are magnetized in opposite directions along their respective magnetization axis 5.5, wherein the southpole of one compartment 5.41 faces away from the axis of rotation 200 and the northpole of the other compartment 5.42 faces away from the rotational axis 100.

Preferably, the angle of the magnetization direction with respect to each other corresponds to an angle of the first section of the coil portion with respect to the second section of the coil portion.

The device 1 according to the invention allows for a compact light-weight design of a device for tilting a mirror by means of a Lorentz-force.

According to a first aspect the coil portion 6 is comprised by the tiltable portion 2 and the magnetic assembly 5 is comprised by the fixed portion 3.

According to a second aspect the coil portion 6 extends away from the reflective layer 2.2 into the actuation space 300 along an imaginary curved surface, particularly a cylindrical surface, centered around the axis of rotation 100, wherein a conductor 6.3 of the one or more coils 6.1 extends perimetrically around a winding axis 6.2 of the coil 6.1, the winding axis 6.2 extending perpendicular with respect to the axis of rotation 100, wherein the conductor 6.3 of each coil 6.1 extends along said imaginary curved surface.

According to a third aspect the magnetic assembly 5 comprises a first portion 3.1 that is arranged radially further away from the axis of rotation 100 than the coil portion 6, wherein the first portion 3.1 comprises a first section 3.3 that is arranged in a first angular space section 601 with respect to the axis of rotation 100, wherein the first section 3.3 has a first actuation face 3.31 facing toward the coil portion 6 forming a first gap section between the coil portion 6 and the first section 3.3, and wherein the first portion 3.1 further comprises a second section 3.4 that is arranged in a second angular space section 602 with respect to the axis of rotation 100, wherein the second section 3.4 has a second actuation face 3.32 facing toward the coil portion 6 forming a second gap section between the coil portion 6 and the second section 3.4, wherein a magnetic field generated by the magnetic assembly 5 extends from the first actuation face 3.31 via the first gap section toward the coil portion 6 and from the coil portion 6 via the second gap portion into the second section 3.4 of the magnetic assembly 5, such that a magnetic field extends through the one or more coils 6.1, 6.2 in a fashion that allows for generating an Lorentz-force for moving the coil portion 6, when an electric current is provided to the one or more coils 6.1, 6.2.

According to a fourth aspect the magnetic assembly 5 comprises a second portion 3.2 of the magnetic assembly 5 that is arranged radially closer to the axis of rotation 100 than the coil portion 6, wherein the second portion 3.2 has a second portion face 3.21 extending along or tangentially to the coil portion 6 forming a gap between the coil portion 6 and the second portion face 3.21, particularly wherein the magnetic field extends inside the second portion 3.2 of the magnetic assembly 5 from the first angular space section 601 toward the second angular space section 602, particularly wherein the second portion 3.2 comprises a compound with a magnetic permeability of greater than one, particularly wherein the second portion 3.2 comprises a ferromagnetic compound.

According to a fifth aspect the magnetic assembly 5 comprises a base portion 3.5 connecting the first and the second section 3.3, 3.4 of the first portion 3.1, particularly wherein the base portion 3.5 comprises a compound with a magnetic permeability of greater than one, particularly wherein the base portion 3.5 comprises a ferromagnetic compound.

According to a sixth aspect the second portion 3.2 is connected to the first portion 3.1 by means of a support structure 3.6 that extends through a free center portion of the coil portion 6, wherein the support structure 3.5 extends between the first and the second section 3.3, 3.4, particularly wherein the support structure 3.5 comprises a compound with a heat conductivity greater than 40 W/m/K, particularly greater than 100 W/m/K, particularly wherein the support structure 3.5 comprises a paramagnetic compound, more particularly wherein the compound comprises aluminum.

According to a seventh aspect the magnetic assembly 5 comprises cooling channels 7 configured to flow a coolant, particularly a liquid coolant, through the magnetic assembly 5 such that heat generated at the coil portion 5 may be dissipated by the coolant, particularly wherein the cooling channels 7 are liquid-tight.

According to an eighth aspect, the coil portion 6 is formed as a planar, particularly disc-shaped portion extending into the actuation space 300 and that is oriented orthogonally to the axis of rotation 100, wherein the conductor 6.3 of the one more coils 6.1 extends circumferentially around a winding axis 6.2 of the coil 6.1, the winding axis extending parallel to the axis of rotation 100, particularly wherein a circumference of each of the one or more coils 6.1 is at least 10 times larger than a coil height along the winding axis 6.2, particularly wherein the one or more coils 6.1 are flat coils.

According to a ninth aspect the magnetic assembly 5 comprises a first portion 3.1 that is arranged on a first side 501 of the coil portion 6, wherein the first portion 3.1 comprises a first section 3.3 that is arranged in a first angular space section 601 with respect to the axis of rotation 100, wherein the first section 3.3 has a first actuation face facing toward the coil portion 6 forming a first gap section between the coil portion 6 and first section 3.1, and wherein the first portion 3.1 further comprises a second section 3.4 that is arranged in a second angular space section 602 with respect to the axis of rotation 100, wherein the second section 3.4 has a second actuation face facing toward the coil portion 5 forming a second gap section between the coil portion and the second actuation face, wherein a magnetic field generated by the magnetic assembly 5 extends from the first actuation face via the first gap section toward the coil portion 6 and from the coil portion 6 via the second gap portion to the second actuation face of the magnetic assembly 5, such that a magnetic field extends through the one or more coils 6.1 in a fashion that allows for generating an Lorentz-force for moving the coil portion 6, when an electric current is provided to the one or more coils 6.1.

According to a tenth aspect the magnetic assembly 5 comprises a second portion 3.2 arranged on a second side 502 of the coil portion 6, wherein the second portion 3.2 comprises a first section 3.3 that is arranged in the first angular space section 601 with respect to the axis of rotation 100, wherein the first section 3.3 has a first actuation face facing toward the coil portion 5 forming a first gap section between the coil portion 5 and the first section 3.3, and wherein the second portion 3.1 further comprises a second section 3.4 that is arranged in the second angular space section 602 with respect to the axis of rotation 100, wherein the second section 3.4 has a second actuation face facing toward the coil portion 6 forming a second gap section between the coil portion 6 and the second actuation face, wherein a magnetic field generated by the magnetic assembly 5 extends from the first section 3.3 of the first portion 3.1 via the first gap section to the first section 3.3 of the second portion 3.2 and from the second section 3.4 of the second portion 3.2 via the second gap section to the second section 3.4 of the first portion 3.1, such that a magnetic field extends through the one or more coils 6.1 of the coil portion 6 in a fashion that allows for generating a Lorentz-force for moving the coil portion, when an electric current is provided to the one or more coils 6.1.

According to an eleventh aspect the first section 3.3 and the second section 3.4 of the first portion 3.1 of the magnetic assembly 5 each comprise a permanent magnet 5.11, 5.12, wherein the magnets 5.11, 5.12 have opposite orientations with regard to their magnetic poles, and particularly wherein the first section 3.3 and the second section 3.4 of the second portion 3.2 of the magnetic assembly 5 each comprise a permanent magnet 5.14, wherein the permanent magnets 5.14 have opposite orientations with regard to their magnetic poles, wherein the magnets 5.11 comprised in the first section 3.3 of the first and the second portion 3.1, 3.2 have the same orientation with regard to their magnetic poles and wherein the magnets 5.12, 5.14 comprised in the second section 3.4 of the first and the second portion 3.1, 3.2 have the same orientation with regard to their magnetic poles.

According to a twelfth aspect the magnetic assembly 5 comprises a first return portion that extends between the first section 3.3 and the second section 3.4 of the first portion 3.1 and wherein the magnetic assembly 5 comprises a second return portion that extends between the first and the second section 3.3, 3.4 of the second portion 3.2, particularly wherein the first and/or the second return portion comprise a compound with a magnetic permeability of greater than one, particularly wherein the first and/or second return portion comprises a ferromagnetic compound.

According to a thirteenth aspect the one or more coils 6.1 are electrically contacted via the bearing assembly 4, that comprises an electric contacting for the one or more coils 6.1 such that an electric current can be provided to the one or more coils 6.1, particularly wherein the electrical contacting is arranged at or in the first and/or the second bearing 6.1.

LIST OF REFERENCE SIGNS

1 Tiltable mirror device
2 Tiltable portion
2.1 Substrate
2.2 Reflective layer
2.4 receptacle
2.41 Bracket holder
2.42 Solid holder
3 Fixed portion
3.1 First portion
3.2 Second portion
3.21 Second portion face
3.31', 3.32', 3.31, 3.32 Actuation face of fixed portion
3.3, 3.3' First section
3.4, 3.4' Second section
3.5 Base portion
3.7 Housing structure
3.8 Circuit board
4 Bearing assembly
4.1 First bearing
4.2 Second bearing
4.3 Spring elements
4.4 beam
4.5 grove
5 Magnetic assembly
5.2 Actuation face
5.10 magnet
5.11, 5.12, 5.13, 5.14 Magnet
5.3 Iron portions
6 Coil portion
6.1 coil
6.2 Winding axis, coil axis
6.3 Electric conductor
6.31 First conductor section
6.32 Second conductor section
9 recess
100 Axis of rotation
201 First side
202 Second side
300 Actuation space
400 Extension plane
500 Imaginary central plane
600 Zero degree plane
601, 602 Angular space sections
O' Central middle point

We claim:
1. A tiltable mirror device comprising the components:
   a tiltable portion comprising a substrate having a reflective layer for reflecting electromagnetic waves,
   a fixed portion relative to which the tiltable portion is movable,
   a bearing assembly mechanically connecting the fixed portion and the tiltable portion, wherein the bearing assembly is arranged to render the tiltable portion tiltable around at least one axis of rotation with respect to the fixed portion, an actuator assembly, wherein the actuator assembly comprises two components, namely a coil portion comprising one or more coils each comprising an electric conductor, and a magnetic assembly (5), wherein one component of the actuator assembly is comprised by the tiltable portion, and wherein the other component of the actuator assembly is comprised by the fixed portion, wherein the components of the actuator assembly are arranged to move the tiltable portion with respect to the fixed portion by means of a Lorentz force, wherein
the actuator assembly is arranged, particularly completely arranged in an actuation space extending away from the reflective layer on a single side of the reflective layer, wherein the magnetic assembly is comprised by the tiltable portion and the coil portion is comprised by the fixed portion, wherein the coil portion is arranged radially further away from the axis of rotation than the magnetic assembly, the coil portion extends away from the reflective layer into the actuation space at least partially along an imaginary curved surface, centered around the axis of rotation, and wherein in a first section of the coil portion and in a second section of the coil portion the conductor extends essentially parallel to the axis of rotation, and further sections of the coil portion are arranged to electrically connect the first section of the coil portion and the second section of the coil portion, and said further sections of the coil portion extend perpendicular to the axis of rotation along a cylindrically shaped imaginary surface.

2. The device according to claim 1, wherein a main extension plane extends along the substrate, wherein the main extension plane extends along an x-axis and a y-axis of a Cartesian coordinate system associated to the tiltable portion, the y-axis corresponds to the axis of rotation,
- a z-axis of the Cartesian coordinate system associated to the tiltable portion extends perpendicular to the x- and y-axis along a radial direction with respect to the axis of rotation, and
- particularly a middle plane of the tiltable portion extends along the z-axis and comprises the axis of rotation.

3. The device according to claim 1, wherein a center of mass of the tiltable portion is comprised in a close vicinity or in the axis of rotation.

4. The device according to claim 1, wherein the bearing assembly comprises a first bearing and a second bearing arranged on opposite sides of the tiltable portion at the axis of rotation.

5. The device according to claim 1, wherein the device comprises a liquid ferrofluidic compound arranged between the coil portion and the magnetic assembly, particularly wherein said ferrofluidic compound is arranged in a gap between the coil portion and the magnetic assembly.

6. The device according to claim 1, wherein the actuation space is limited along the axis of rotation by an extension of the substrate or the receptacle along the y-axis.

7. The device according to claim 1, wherein the magnetic assembly comprises two compartments,
- two compartments are magnetized along a magnetization axis respectively,
- the magnetization axes extend radially away from the axis of rotation towards the actuation space at an angle with respect to each other.

8. The device according to claim 1, wherein the magnetic assembly comprises a north pole and a south pole that are separated along the middle plane of the tiltable portion.

9. The device according to claim 1, wherein the magnetic assembly extends away from the reflective layer into the actuation space at least partially along an imaginary curved surface, particularly a cylindrical surface, centered around the axis of rotation.

10. The device according to claim 1, wherein the coil portion is arranged radially further away from the axis of rotation than the magnetic assembly, wherein a winding axis of the one or more coils of the coil portion extends perpendicular to the axis of rotation along an x-axis of the fixed portion, particularly wherein the conductor of the one or more coils extends from a first section of the fixed portion that is arranged in a first angular space section with respect to the axis of rotation to a second section of the fixed portion that is arranged in a second angular space section with respect to the axis of rotation, such that a Lorentz-force for moving the tiltable portion is generated, when an electric current is provided to the one or more coils of the coil portion.

11. The device according to claim 1, wherein the bearing assembly is completely arranged in the actuation space extending away from the reflective layer on a single side of the reflective layer.

12. The device according to claim 1, wherein the bearing assembly comprises a roller bearing which is at least partially arranged between the fixed portion and the tiltable portion, wherein the axis of rotation extends in the reflective layer.

13. The device according to claim 1, wherein the tiltable portion is moved out of its equilibrium state by means of the Lorentz-force, and a restoring force is arranged to move the tiltable portion back to the equilibrium state, wherein the actuator assembly is arranged such that the amount of maximum Lorentz force and the restoring force are the same at a maximum tilt angle of the tiltable portion.

* * * * *